United States Patent [19]
Käsler et al.

[11] Patent Number: 6,132,778
[45] Date of Patent: Oct. 17, 2000

[54] METHOD OF PRODUCING A COMPOSITE PREPARATION FOR MAKING SILAGE FROM GREEN FODDER

[75] Inventors: Bruno Käsler, Ludwigshafen; Hans Müschen, Maxdorf, both of Germany

[73] Assignee: BASF Aktiengesellschaft, Ludwigshafen, Germany

[21] Appl. No.: 09/011,099

[22] PCT Filed: Jul. 26, 1996

[86] PCT No.: PCT/EP96/03298

§ 371 Date: Apr. 7, 1998

§ 102(e) Date: Apr. 7, 1998

[87] PCT Pub. No.: WO97/05235

PCT Pub. Date: Feb. 13, 1997

[30] Foreign Application Priority Data

Jul. 28, 1995 [DE] Germany ............ 195 27 617

[51] Int. Cl.[7] .................. A23K 1/12; A23K 1/14
[52] U.S. Cl. .................. 426/54; 426/53; 426/2; 426/635; 426/807
[58] Field of Search .................. 426/2, 807, 53, 426/54, 636

[56] References Cited

U.S. PATENT DOCUMENTS

| | | | |
|---|---|---|---|
| 3,677,897 | 7/1972 | Jeffreys | 195/55 |
| 4,073,889 | 2/1978 | Beck et al. | 424/164 |
| 4,789,551 | 12/1988 | Sayle | 426/54 |
| 4,927,763 | 5/1990 | Sudoma et al. | 435/260 |

FOREIGN PATENT DOCUMENTS

| | | |
|---|---|---|
| 131114 | 1/1985 | European Pat. Off. . |
| 298 605 | 1/1989 | European Pat. Off. . |
| 329 164 | 8/1989 | European Pat. Off. . |
| 36 16 563 | 11/1990 | Germany . |
| 39 16 563 | 11/1990 | Germany . |
| 3916563 | 11/1990 | Germany . |
| 40 34 749 | 5/1992 | Germany . |
| 1410524 | 10/1993 | U.S.S.R. . |
| 2008381 | 6/1979 | United Kingdom . |

*Primary Examiner*—Chhaya D. Sayala
*Attorney, Agent, or Firm*—Keil & Weinkauf

[57] ABSTRACT

In a process for the preparation of a combination preparation for ensiling green feed, lactic acid-producing bacteria are mixed with a granulated carrier, preferably calcium carbonate, to give a formulation and this formulation is mixed with an alkali metal and/or alkaline earth metal salt of an aliphatic fatty acid which is also granulated, and, if required, conventional assistants.

4 Claims, No Drawings

METHOD OF PRODUCING A COMPOSITE PREPARATION FOR MAKING SILAGE FROM GREEN FODDER

The present invention relates to a process for the preparation of a combination preparation which contains lactic acid-producing bacteria for ensiling green feed.

The use of preparations containing lactic acid-producing bacteria (LAB) and alkali metal salts of aliphatic fatty acids as ensiling agents for acidifying green feed and preventing aerobic degradation processes in the silage is known. DE-A-39 16 563 describes a combination preparation which contains alkali metal and/or alkaline earth metal formates, LAB and, if required, conventional carriers and/or assistants. The preparation can be used in the form of a scatterable mixture which is prepared, directly before addition to the material being converted into silage, by mixing the LAB in lyophilized (freeze-dried) form with the other components. Alternatively the bacteria and the formate may also be added separately to the material being converted into silage. The disadvantage of separate addition is that two operations have to be performed in ensiling.

DE-A-40 34 749 discloses, as an ensiling agent, a combination preparation which contains the LAB in an aqueous solution of alkali metal salts of aliphatic fatty acids. The preparation is present in the form of a suspension, which however must be used as rapidly as possible after preparation, since the LAB die within a short time. In the case of relatively long storage, it is therefore recommended that the aqueous solution of the alkali metal salt of the aliphatic fatty acid and the lyophilized bacterial culture be transferred separately to the user so that the components can be mixed shortly before use. However, a disadvantage of this procedure too is that the bacteria start to die immediately after the mixing procedure and, where there is a delay in ensiling, for example in the case of machine damage, rain or the like, the ensiling agent often can no longer be used. Another problem here is that, owing to the death of the bacteria after combination of the two components, the amount of bacteria still alive is frequently unknown, so that metering, in particular metering in the field, is extremely difficult.

It is an object of the present invention to provide a combination preparation for ensiling green feed, which preparation ensures better stability of the LAB.

We have found that this object is achieved and that, the stability of the LAB is exceptionally improved by mixing LAB with a carrier and then mixing this mixture with a salt of an aliphatic fatty acid. Unexpectedly, it was found that, in contrast to dissolution of the LAB in a sodium propionate or calcium propionate solution, as is known, in this case hardly any LAB die and, even on prolonged storage, the proportion of living bacteria is still extremely high.

The invention therefore relates to a process for the preparation of a combination preparation containing LAB, alkali metal and/or alkaline earth metal salts of aliphatic fatty acids and, if required, conventional assistants, wherein the LAB are mixed with a carrier to give a formulation and this formulation is mixed with at least one alkali metal and/or alkaline earth metal salt of an aliphatic fatty acid and, if required, conventional assistants. Preferred embodiments of the invention are defined in the following.

The LAB suitable for carrying out the novel process are not subject per se to any restriction. Strains of LAB which are suitable in principle are all those which grow under the conditions prevailing in the silo and produce sufficient lactic acid, ie. form lactic acid in an amount such that the resulting pH reduction permits no further development of microorganisms. Suitable LAB are those of the genus Lactobacillus, Lactococcus, Streptococcus, Staphylococcus or Pediococcus. Particularly good results were obtained with bacteria of the genus *Lactobacillus plantarum*. The bacteria are preferably used in lyophilized form.

Carriers which are suitable according to the invention are all carriers which are capable of adsorbing the LAB. Calcium carbonate or organic carriers, such as bran, preferably wheat bran, or granulated sugar are particularly suitable. The organic carriers are used in a form in which they are inactive toward the LAB, preferably in freeze-dried form. In a preferred embodiment of the invention, the carrier before mixing with the LAB is granulated. In principle, a granular powder which no longer produces dust is prepared on granulation of a powder. Suitable granulation processes are known to a person skilled in the art. The LAB are used in an amount of from $10^8$ to $10^{17}$, in particular from $10^8$ to $10^{13}$, preferably from $10^{10}$ to $10^{12}$, microorganisms, based in each case on 1 kg of carrier. The bacteria may be mixed with the carrier in any desired manner, but it should be ensured that the bacteria are not damaged. When a granulated carrier is used, it is necessary during mixing to ensure that the granules are retained and the carrier does not become dust.

In the novel preparation of the combination preparation, the formulation of LAB with the carrier is mixed with one or more alkali metal or alkaline earth metal salts of an aliphatic fatty acid. Preferably, the formulation is used in an amount of from 1 to 99, preferably from 20 to 80, in particular from 40 to 60, % by weight, based on formulation plus salt as 100% by weight. Salts which are particularly suitable according to the invention are the alkali metal and/or alkaline earth metal salts of the $C_1$–$C_6$-monocarboxylic acids, preferably $C_1$–$C_3$-monocarboxylic acids. The alkali metal and/or alkaline earth metal salts of the dicarboxylic acids, tricarboxylic acids, in particular citric acid, and of sorbic acid are also suitable. Particularly preferred salts are calcium formate and calcium propionate. In a particularly preferred embodiment of the invention, the salts are granulated before being mixed with the LAB formulation.

In a further preferred embodiment of the invention, from 0.1 to 10, preferably from 2 to 5, parts by weight, based on LAB formulation plus salt as 100 parts by weight, of conventional assistants are added to the combination preparation during its preparation according to the invention. Suitable assistants are, for example, sodium chloride, other mi salts, unripe grain meal, dried beet pulp, molasses, sugar, starch hydrolysis products, wood hydrolysis products or carbohydrate-cleaving enzymes.

A combination preparation according to the invention then contains a formulation of the components carrier based on LAB, alkaline earth metal salts or alkali metal and alkaline earth metal salts of aliphatic fatty acids and, if required, conventional assistants.

The green feed which can be ensiled with a combination preparation according to the present invention is not subject per se to any particular restriction. For example, grasses, Leguminosae, whole plants, cereals and corn are particularly suitable. The combination preparation is preferably added to the green feed in an amount of from 0.1 to 10 kg, in particular from 0.5 to 3 kg, based in each case on 1 tonne of dry matter of the green feed.

In a preferred embodiment of the invention, the components of the combination preparation are mixed with one another by the producer and the finished combination preparation is transferred to the user. Mixing is not subject per se to any restriction but here too, as in the mixing of the LAB with the carrier, it is necessary to ensure that the bacteria are not damaged and, where a granulated carrier is used, the granules are retained. The two components, ie. the LAB formulation and the salt, may also be transferred separately to the user, who then mixes the components with one another. Application of the combination preparation to the material being converted into silage is effected by means of an applicator, as known for the application of such preparations in industry, for example a solids applicator. The combination preparation may be added during chopping and/or during or after storage of the green feed.

The present invention has the advantage that excellent LAB stability of at least 6 months is achieved. As a result of the higher stability, exact metering is possible, in contrast to known processes in which the bacteria die rapidly. The present invention thus makes it possible to use a combination preparation for acidifying green feed and preventing aerobic degradation processes in the green feed, which combination preparation has the advantage over known processes that there is no need for separate application of salts of aliphatic fatty acids and LAB or for application of aqueous LAB suspensions with low stability.

The Examples which follow constitute further preferred embodiments of the invention and illustrate the invention.

EXAMPLE 1

1 g in each case of lyophilized lactic acid bacteria ($5 \times 10^{11}$ cfu/g) of the genus *Lactobacillus plantarum* (LAB) were mixed with 1000 g of granulated calcium carbonate to give an LAB formulation. Granulated and nongranulated calcium propionate were then mixed, according to Table 1, with LAB formulation or lyophilized LAB (without carrier) in the ratio of 20% by weight of LAB formulation or lyophilized LAB (without carrier) to 80% by weight of calcium propionate, and the stability of the lactic acid bacteria was determined immediately and after 16 weeks. For this purpose, 1 g of sample in 1 l of 0.7% strength sodium chloride solution was shaken with 50 mM potassium phosphate buffer, pH 7.5, for 4 hours at 4° C. A 100 µl sample was then taken and was plated out on a Lactobacillus Agar Plate (MRS agar according to DE MAN, ROGOSA and SHARPE, from Merck, Darmstadt), to which 2%, based on the agar, of solid calcium carbonate had also been added. After 2 days, the number of colonies which had grown was counted. A pure LAB formulation with granulated calcium carbonate as carrier served as a comparison. The results obtained are shown in Table 1, percentages being by weight.

TABLE 1

|  | Colony forming units ($10^5$/mg LAB) after: | |
|---|---|---|
|  | 0 weeks | 16 weeks |
| 100% of LAB*; carrier granulated | 2.7 | 1.2 |
| 20% of LAB*, carrier granulated + 80% of calcium propionate, granulated | 2.7 | 1.3 |
| 20% of LAB + 80% of calcium propionate, not granulated | 2.7 | <0.1 |
| 20% of LAB + 80% of calcium propionate, granulated | 2.7 | <0.1 |
| 20% of LAB*, carrier granulated + 80% of calcium propionate, not granulated | 2.7 | 0.4 |

*LAB formulation

As shown in Table 1, when LAB is formulated with granulated calcium carbonate and then mixed with granulated calcium propionate, there is no reduction in the growth rate relative to a pure LAB formulation after a storage time of 16 weeks. The stability of the combination preparation prepared according to the invention is even slightly increased compared with the stability of a pure LAB formulation. This effect occurs only if both the carrier (calcium carbonate) and the salt (calcium propionate) are granulated.

EXAMPLE 2

1 g of lyophilized lactic acid bacteria ($5 \times 10^{11}$ cfu/g) of the genus *Lactobacillus plantarum* were mixed with 1000 g of granulated calcium carbonate to give an LAB formulation. This formulation was mixed with granulated calcium formate in the ratio of 20% by weight of LAB formulation to 80% by weight of calcium formate, and the stability of the lactic acid bacteria was determined immediately and after 16 weeks, similarly to Example 1. The results are documented in Table 2, a pure LAB formulation with granulated calcium carbonate as carrier serving as a comparison.

TABLE 2

|  | Colony-forming units ($10^5$/mg LAB granules) after: | |
|---|---|---|
|  | 0 weeks | 16 weeks |
| 100% of LAB* | 2.7 | 1.2 |
| 20% of LAB* + 80% of calcium formate | 2.7 | 1.3 |

*LAB formulation

Table 2 shows that, when LAB is mixed with calcium carbonate as carrier and the mixture is subsequently mixed with calcium formate, there is no reduction in the growth rate of the bacteria relative to a pure LAB formulation even after a storage time of 16 weeks. Similarly to Table 1, in this case too the novel process even slightly increases the stability of the LAB relative to a pure LAB formulation.

EXAMPLE 3

Using a procedure similar to that of Example 1, lactic acid bacteria were mixed with granulated calcium carbonate to give an LAB formulation, which was then mixed with granulated calcium propionate in the ratio of 20% by weight of LAB formulation to 80% by weight of calcium propionate. This combination preparation was added to a green feed in an amount of 0.2% by weight, based on 100% by weight of green feed. The green feed contained about 82% of alfalfa and 3% of orchard grass and also rye grasses, white clover, red clover and dandelion. It was wilted to almost 20% dry matter (DM) and comminute with a chopping machine. The contents of the green feed are shown in Table 3. The content of dry matter (DM content) is based here on 100% by weight of green feed. Since the green feed had relatively high raw fiber contents and low sugar contents, this feed was very difficult to ensile.

TABLE 3

| Contents of the starting material | | |
|---|---|---|
| DM content | % by weight | 19.6 |
| Raw ash | g per kg of DM | 112 |
| Raw protein | g per kg of DM | 178 |
| Raw fiber | g per kg of DM | 338 |
| Sugar | g per kg of DM | 44 |
| Sugar/raw protein |  | 0.25 |
| Fermentable sugar | % in DM | 0.9 |

The results of the ensiling test with and without addition of the combination preparation after an ensiling time of 6 months are shown in Table 4, in which the data are based on the dry matter content corrected with the fermentation acids, ammonia and ethanol and in accordance with the standard DLG (Deutsche Landwirtschaftliche Gesellschaft) method.

TABLE 4

Contents and fermentation parameters of the silages with and without the addition of the combination preparation after an ensiling time of 6 months

| Variant | | No addition | Addition of combination preparation |
|---|---|---|---|
| DM corrected | % | 18.3 | 20.4 |
| Raw ash | g per kg of DM | 116 | 131 |
| Raw protein | | 202 | 183 |
| Raw fiber | | 389 | 340 |
| Sugar | | 7 | 8 |
| pH | | 6.1 | 5.8 |
| Lactic acid | g per kg of DM | 22 | 5 |
| Acetic acid | | 55 | 40 |
| Butyric acid | | 52 | 22 |
| Propionic acid | | 9 | 28 |
| Ethanol | | 10 | 4 |
| v. A./tot. A. | % | 84 | 95 |
| $NH_3$—N/tot. N | % | 38 | 19 |
| Fermentation gas loss | % | 11.7 | 5.9 |
| DLG points | | −45 | −14 |

$NH_3$—N/tot. N: Ammonia nitrogen as a proportion of total nitrogen
v. A./tot. A.: Volatile acids as a proportion of total acid As is evident from Table 4, the use of the novel combination preparation leads to substantially lower lactic acid, butyric acid and ethanol contents and a smaller proportion of ammonia nitrogen than no addition, and hence to considerably improved silage.

What is claimed is:

1. A process for manufacturing a preparation containing lactic acid-producing bacteria, wherein the lactic acid-producing bacteria are mixed with a granulated carrier selected from the group consisting of calcium carbonate and an organic carrier to give a formulation and this formulation is mixed with at least one alkali metal and/or alkaline earth metal salt of an aliphatic fatty acid in granular form and optionally conventional assistants selected from the group consisting of sodium chloride, mineral salts, unripe grain meal, dried beet pulp, molasses, sugar, starch hydrolysis products, wood hydrolysis products and carbohydrate-cleaving enzymes.

2. A preparation containing a formulation of the components (i) carrier based lactic acid-producing bacteria, (ii) alkali metal or alkaline earth metal salts or alkali metal and alkaline earth metal salts of aliphatic fatty acids and (iii) optionally conventional assistants selected from the group consisting of sodium chloride, mineral salts, unripe grain meal, dried beet pulp, molasses, sugar, starch hydrolysis products, wood hydrolysis products and carbohydrate-cleaving enzymes, manufacturable in a process as claimed in claim 1.

3. A method for ensiling green feed, wherein a preparation as claimed in claim 2 is added to the feed during or after storage.

4. A method as claimed in claim 3, wherein the preparation is added in an amount of from 0.1 to 10 kg, based on 1 ton of dry matter of the green feed.

* * * * *